(12) United States Patent
Aryanfar

(10) Patent No.: US 9,887,467 B2
(45) Date of Patent: *Feb. 6, 2018

(54) NEAR-FIELD COMMUNICATIONS WITH MULTIPLE TRANSMIT AND MULTIPLE RECEIVE ANTENNAE

(71) Applicant: QUALCOMM INCORPORATED, San Diego, CA (US)

(72) Inventor: Farshid Aryanfar, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/132,097

(22) Filed: Apr. 18, 2016

(65) Prior Publication Data

US 2017/0077612 A1 Mar. 16, 2017

Related U.S. Application Data

(63) Continuation of application No. 13/704,564, filed as application No. PCT/US2011/038154 on May 26, 2011, now Pat. No. 9,319,105.
(Continued)

(51) Int. Cl.
*H01Q 21/24* (2006.01)
*H04B 5/00* (2006.01)
(Continued)

(52) U.S. Cl.
CPC .......... *H01Q 21/24* (2013.01); *H01Q 1/2291* (2013.01); *H04B 5/0025* (2013.01);
(Continued)

(58) Field of Classification Search
USPC .......... 375/224, 130; 455/103, 69, 411, 525
See application file for complete search history.

(56) References Cited

U.S. PATENT DOCUMENTS 2,434,511 A * 1/1948 Osterman ............. H01F 41/125
29/605
6,201,801 B1 3/2001 Dent
(Continued)

FOREIGN PATENT DOCUMENTS

GB 2434511 A 7/2007
WO WO-2006082560 A1 8/2006

OTHER PUBLICATIONS

"Antenna Development" downloaded from griffithsrf.com/en/services1_antenna.html on Apr. 6, 2010, 4 pgs.
(Continued)

*Primary Examiner* — Eva Puente
(74) *Attorney, Agent, or Firm* — Holland & Hart LLP/Qualcomm

(57) ABSTRACT

Near-field communication (NFC) system provides a plurality of transmit antennae. The transmit antennae of the plurality have at least two different polarizations. A plurality of receive antennae have polarizations arranged to receive signals from respective antennae of the transmit antennae, such that each polarization of the transmit antennae has a receive antennae with a corresponding polarization. The transmitters are tuned to a transmit frequency and each have a dimension. A distance between the receive and the transmit antennae is no greater than a greater of twice a maximum dimension squared of the transmit antennae divided by a wavelength of transmission and a wavelength of transmission divided by $2\pi$.

5 Claims, 6 Drawing Sheets

Related U.S. Application Data

(60) Provisional application No. 61/359,465, filed on Jun. 29, 2010.

(51) Int. Cl.
*H04B 7/04* (2017.01)
*H04B 7/06* (2006.01)
*H04B 7/10* (2017.01)
*H04B 7/0413* (2017.01)
*H01Q 1/22* (2006.01)

(52) U.S. Cl.
CPC ......... *H04B 5/0031* (2013.01); *H04B 5/0081* (2013.01); *H04B 7/0413* (2013.01); *H04B 7/0469* (2013.01); *H04B 7/0689* (2013.01); *H04B 7/10* (2013.01); *Y02B 60/50* (2013.01)

(56) References Cited

U.S. PATENT DOCUMENTS

| | | | |
|---|---|---|---|
| 6,785,341 B2 | 8/2004 | Walton et al. | |
| 7,123,887 B2* | 10/2006 | Kim | H04B 7/0669 375/267 |
| 7,567,621 B2 | 7/2009 | Sampath et al. | |
| 7,580,001 B2 | 8/2009 | Tsai et al. | |
| 7,583,609 B2 | 9/2009 | Catreux et al. | |
| 8,126,433 B2* | 2/2012 | Haartsen | H04B 5/0025 455/41.1 |
| 9,319,105 B2 | 4/2016 | Aryanfar | |
| 2007/0099578 A1* | 5/2007 | Adeney | H04B 7/0408 455/69 |
| 2007/0149180 A1 | 6/2007 | Lin et al. | |
| 2008/0129634 A1* | 6/2008 | Pera | H01Q 9/0435 343/853 |
| 2008/0151798 A1 | 6/2008 | Camp et al. | |
| 2009/0225809 A1* | 9/2009 | Abou Rjeily | H04B 1/71635 375/130 |
| 2010/0015918 A1 | 1/2010 | Liu et al. | |
| 2011/0250926 A1* | 10/2011 | Wietfeldt | H01Q 1/243 455/525 |
| 2013/0267173 A1* | 10/2013 | Ling | H04B 5/00 455/41.1 |
| 2014/0098846 A1* | 4/2014 | Emmanuel | H04W 24/06 375/224 |

OTHER PUBLICATIONS

Cetiner et al., "A MIMO System with Multifunctional Reconfigurable Antennas," IEEE AWPL, Dec. 2006, 4 pgs, Institute of Electrical and Electronics Engineers.

Hwang et al., "Signal Enhancement through Polarization Adaptively on Transmit in a Near-Field MIMO Environment," Antennas and Propagation Society Symposium, 2005, pp. 301-304, vol. 2A, Institute of Electrical and Electronics Engineers, Washington, DC.

ISA/EP, International Search Report and Written Opinion of the International Searching Authority, Int'l Application No. PCT/US2011/038154, dated Aug. 16, 2011, European Patent Office, Rijswijk, NL, 17 pgs.

Jiang et al., "On the Modeling of Polarized MIMO Channel," in Proc. 13th Eur. Wireless Conference, Paris, France, Apr. 2007, 7 pgs.

PCT Response dated Aug. 25, 2011 to the Invitation to Correct Defects (Second Response) re PCT. Int'l. Application No. PCT/US2011/038154, 7 pgs.

PCT Statement under Article 19(1) dated to WIPO Oct. 24, 2011 re Int'l. Application No. PCT/US2011/038154, 6 pgs.

Sarkar et al., "Signal Enhancement in a Near-Field MIMO Environment through Adaptivity on Transmit and Polarization Diversity," Antennas and Propagation Society Symposium, 2008, 2 pgs., Institute of Electrical and Electronics Engineers, Piscataway, NJ.

Sony News Release dated Feb. 8, 2010, "Sony Develops World's First Millimeter-wave Wireless Intra-Connection Technology for Internal High Speed Data Transfer within Electronics Products," downloaded from sony.net/News, 2 pgs.

Varanasi et al, "On-Chip Bond-Wire Antennas on CMOS-Grade Silicon Substrates," Antennas and Propagation Society International Symposium, Jul. 2008, 4 pgs., Institute of Electrical and Electronics Engineers.

Vithanage et al, "Preceding in OFDM-Based Multi-Antenna Ultra-Wideband Systems," Advances in Signal Processing for Communications, IEEE Communications Magazine, Jan. 2009, 7 Pages, Institute of Electrical and Electronics Engineers.

Wikipedia entry entitled "MIMO," downloaded from http://en.wikipedia.org/wiki/Mimo on May 11, 2010, 9 pages.

Yun-Taek et al, "A Spiral-Dipole Antenna for MIMO Systems," IEEE Antennas and Wireless Propagation Letters, vol. 7, 2008, pp. 803-806, Institute of Electrical and Electronics Engineers.

\* cited by examiner

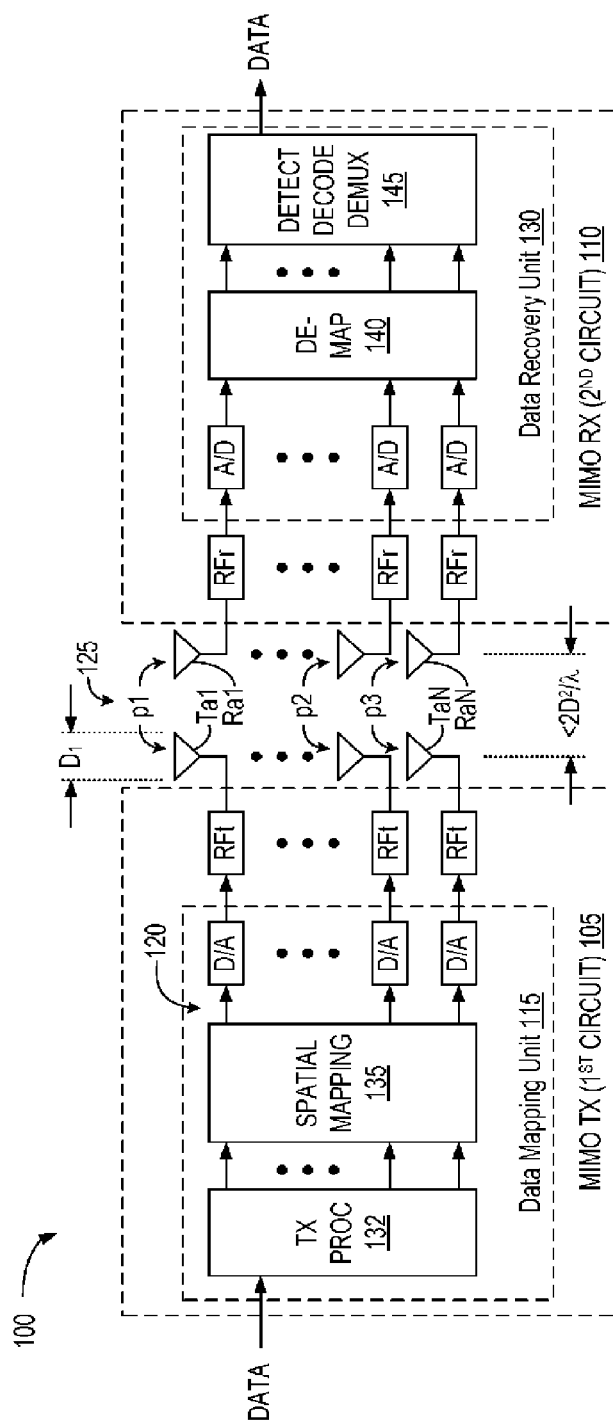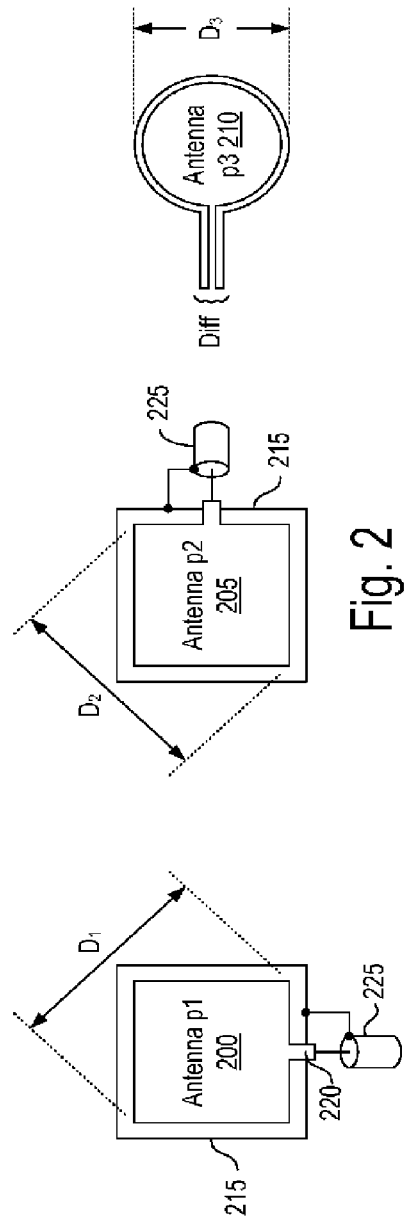
Fig. 1
Fig. 2

follows.

NEAR-FIELD COMMUNICATIONS WITH MULTIPLE TRANSMIT AND MULTIPLE RECEIVE ANTENNAE

BACKGROUND

Radio systems used for communications include a transmitter and a receiver. The transmitter sends an electrical signal to a radiating element (antenna), which facilitates the propagation of the signal as electromagnetic waves that can travel through free space. The electromagnetic wave can be intercepted by a receiving antenna (receiver), which captures some of the energy of the wave. The receiver converts the captured energy into a received signal that can be interpreted to recover the information conveyed from the transmitter.

This disclosure relates to "near-field" communication systems, as opposed to "far-field" radio systems. The distinctions between near-field and far-field systems relate to the distance separating the transmit and receive antennas. Assuming a transmitting antenna with a largest dimension D transmitting a signal of wavelength λ, for example, the receive antenna is in the near field if the distance separating the transmitting and receiving antennas is less than $2D^2/\lambda$. Larger separations place the receive antenna in the far field. The distinction between the near and far fields is important because some components of a transmitted signal fall-off rapidly with distance. The properties of transmitted electromagnetic waves therefore change dramatically between the near and far fields.

Near Field Communication (NFC) is a wireless technology that supports communication within the near field region. Typical uses include RFID, contactless payment methods, identity documents, and electronic keys, all of which are low data-rate applications. More recently, NFC is a candidate for mobile-to-mobile communication, and for communication within electronic products. Such wireless interconnection technologies often require higher data rates than traditional NFC systems.

BRIEF DESCRIPTION OF THE FIGURES

FIG. 1 illustrates a near-field communication (NFC) system 100 that supports increased data rates using a multiple-input-multiple-output (MIMO) interface.

FIG. 2 depicts three antennas 200, 205, and 210 that can be used for the transmit antennas of FIG. 1 to provide polarization diversity.

DETAILED DESCRIPTION

Figure 3:
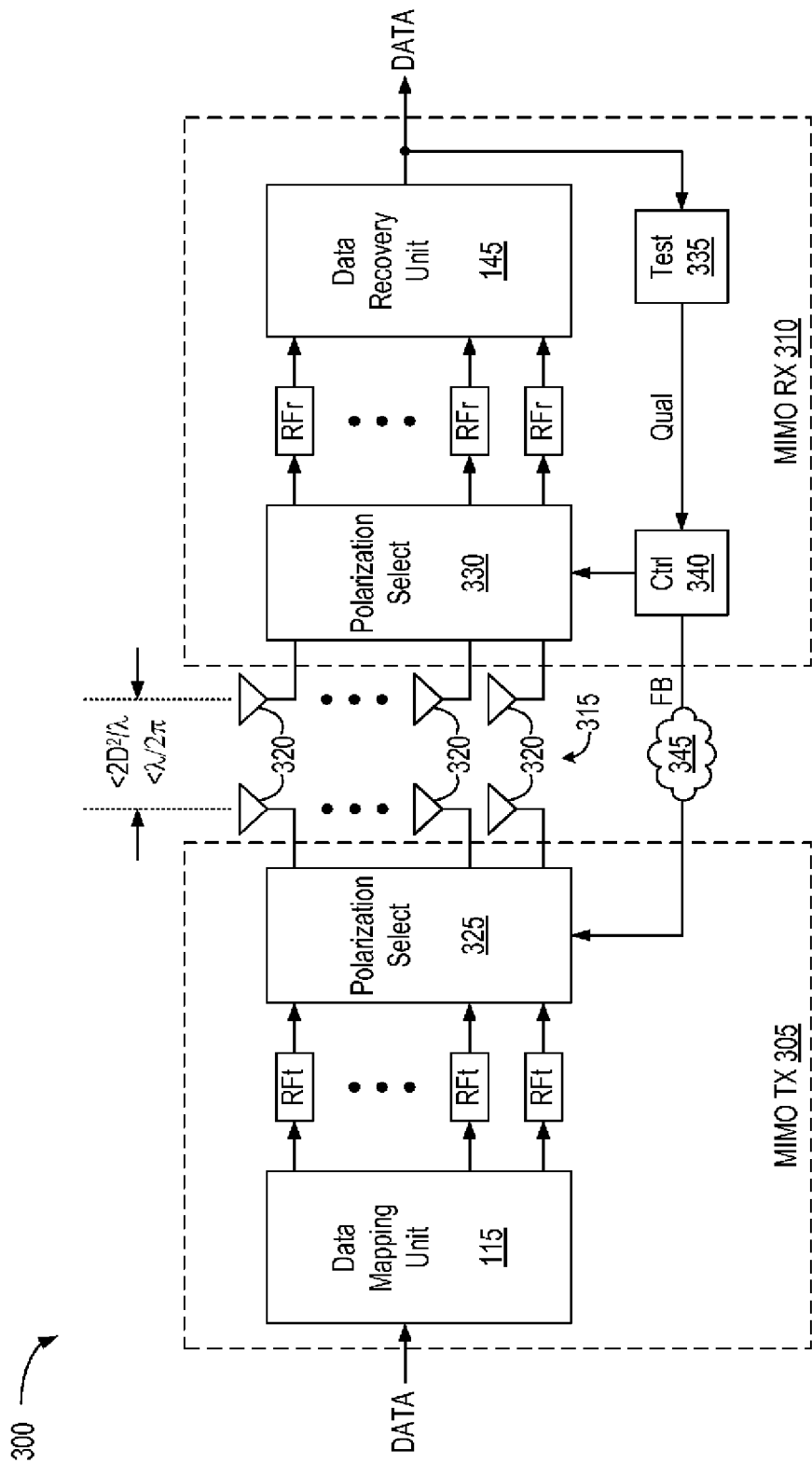
FIG. 3 depicts an NFC system 300 in which a MIMO transmitter 305 and MIMO receiver 310 communicate via a near-field matrix channel 315.

FIG. 1 illustrates a near-field communication (NFC) system 100 that supports increased data rates using a multiple-input-multiple-output (MIMO) interface. System 100 includes a first circuit 105, a MIMO transmitter, with Nt transmit antennas Ta[Nt:1] to transmit Nt radio-frequency (RF) signals to Nr receive antennas Ra[Nr:1] of a second circuit 110, a MIMO receiver. MIMO transmitter 105 sends the Nt signals via respective antennas Ta[Nt:1] through an air interface that provides a matrix channel 125. The Nt signals and Nr receive antennas create Nt*Nr signal paths between the transmit and receive antennas. Each receive antenna thus receives a signal vector that combines components of Nt transmitted signals. Receiver 110 receives and decodes the resulting Nr signal vectors to recover the originally transmitted information.

System 100 uses a combination of antenna spacings and polarizations to reduce correlations between the near-field paths of matrix channel 125, and thus improves channel matrix invertibility and allows for closer to ideal MIMO operation. System 100 thus increases the effective data rate achieved through MIMO techniques. The resulting cumulative data rate of the proposed MIMO system is considerably increased over conventional near-field systems. System 100 illustrates a one-directional MIMO system, but can be modified to support bi-directional communication, either using the same or different sets of antennas.

Transmitter 105 includes a data-mapping unit 115 that divides a data stream signal DATA, received on a like-named node, into parallel data streams 120. RF transmitters RFt, tuned to a center frequency f and wavelength λ, transmit the parallel data streams 120 as Nt respective modulated signals via respective transmit antennas Ta[Nt:1] into channel 125. Each transmit antenna has a largest dimension $D_i$. For example, the largest dimension of antenna Ta1 is $D_1$. In embodiments in which the largest dimension $D_i$ varies among antennas, the greatest of these is termed the maximum dimension D. In the illustration of FIG. 1, the largest dimension $D_i$ is the same for all antennas, so maximum dimension D equals dimension $D_i$. Dimensions D and $D_i$ may be selected to efficiently transmit RF signals equal or near wavelength λ.

Because system 100 is an NFC system, the transmit antennas Ta[Nt:1] and receive antennas Ra[Nr:1] are separated from one another by a distance of less than $2D^2/\lambda$, which puts the receive antennas Ra[Nr:1] in the near field of the transmit antennas. The distance of up to $2D^2/\lambda$ from a transmit antenna is sometime referred to as the "Fresnel zone." In some embodiments, all of receive antennas Ra[Nr:1] are within the near field of each transmit antenna. On the receive side, RF receive front ends RFr transfer signals recovered by receive antennas Ra[Nr:1] from channel 125 to a data-recovery unit 130, which processes the recovered signals to recreate the data signal DATA originally sourced from transmitter 105.

Data mapping unit 115 and recovery unit 130 are conventional in this example, and the design and operation thereof are well known to those of skill in the art. Detailed discussions of those components are therefore omitted. Briefly, a transmit processing block 132 encodes digital data DATA into a number of parallel data streams. Spatial mapping logic 135 uses a MIMO mapping scheme to map these data streams to corresponding digital-to-analog converters D/A, one for each RF transmitter RFt. Signals are mapped before conversion to analog signals in this example, but the mapping may also be accomplished in the analog domain. A number of mapping schemes may be used, and these fall within the general categories of precoding, spatial multiplexing, and diversity coding. Each of these mapping schemes spreads the information in data signal DATA across the transmit antennas to form a matrix channel in which transmit antennas convey redundant symbols.

Spatial mapping logic 135 does not require equal numbers of inputs and outputs, and various special mappings can be used in assigning inputs to outputs. In receiver 110, data recovery unit 130 converts the signals from receivers RFr from analog to digital signals, using analog-to-digital (A/D) converters, and de-maps the resulting digital data streams using de-mapping logic 140. A final processing block 145 detects, decodes, and de-multiplexes the parallel data streams from de-mapping logic 140 to recover the original data DATA. Block 145 combines the signals from the receive antennas using a de-mapping scheme that complements the MIMO mapping scheme employed at the transmitter. In other embodiments the de-mapping may be accomplished in the analog domain.

System 100 reduces correlation between channels using different polarizations, which can reduce the need for high bandwidth to achieve a high data rate in a NFC system. Specifically, different ones of transmit antennas Ta[Nt:1] have different polarizations, respective polarizations p[3:1] in this embodiment. Antenna polarization refers to the orientation of the electric field of a transmitted radio wave with respect to a reference, such as the Earth's surface, and is determined by the physical structure of the antenna and by its orientation. The different polarizations p[3:1] of the transmit antennas Ta[Nt:1] create polarization diversity among the RF signals within channel 125. Receive antennas Ra[Nr:1] offer a mixture of polarizations that are optimally selected to take advantage of the polarization diversity of the signals within channel 125 and minimize correlation between the links. In this example, the three depicted transmit-side antennas have three respective polarizations, and the depicted receive-side antennas have the same three polarizations. More generally, some mixture of polarizations is used at the transmit side of channel 125 to reduce signal correlation within the channel to allow some number of receive antennas to better discriminate between those signals.

Although system 100 includes equal numbers of transmit and receive antennas, this equality is not necessary. The transmitted RF signals can be modulated in various forms (phase, magnitude, or both) to convey information, as is well known to those of skill in the art. Where a transmitted signal has more than a single frequency tone, wavelength λ refers to the mean wavelength of the transmitted RF signals.

FIG. 2 depicts three antennas 200, 205, and 210 that can be used for the transmit antennas of FIG. 1 to provide polarization diversity. Antenna 200 is a patch antenna disposed over a ground plane 215 and including a feed 220. A transmission line 225 provides a single-ended signal to feed 220. Antenna 205 is similar, but the feed 225 is oriented at a ninety-degree angle with respect to the otherwise similar feed of antenna 200; as a consequence, the electric fields of the transmitted signals from antennas 200 and 205 will be oriented differently. The third antenna 210, a loop antenna, transmits a differential signal Diff as an RF signal having an electric field oriented differently to the electric fields of the signals transmitted by antennas 200 and 205.

Antennas 200, 205, and 210 can be used to provide the three polarities p1, p2, and p3 of FIG. 1. Receiver 110 can use a similar array of antennas to take advantage of the polarization diversity of channel 125. Where the maximum dimension $D_i$ differs between antennas, the near-field spacing between antenna arrays in a MIMO system is determined by the largest of dimensions $D_i$ for the antennas in the array. In the example of FIG. 2, dimensions $D_1$ and $D_2$ are equal, and are greater than dimension $D_3$. Assuming antenna's 200, 205, and 210 were used in MIMO system 100 of FIG. 1, dimension D for calculating the near field would be equal to dimensions $D_1$ and $D_2$, and would be greater than dimension $D_3$.

FIG. 3 depicts an NFC system 300 in which a MIMO transmitter 305 and MIMO receiver 310 communicate via a near-field matrix channel 315. The antenna separation defining channel 315 is called out as less than the greater of $2D^2/\lambda$ and $\lambda/2\pi$. The wavelength divided by twice pi ($\lambda/2\pi$), is an alternate definition for the near field region.

System 300 is in some ways similar to system 100 of FIG. 1, with like-identified elements being the same or similar. System 300 differs from system 100, however, in that the polarization of each antenna 320 used to create matrix channel 315 is adjustable. The polarizations of the transmit and receive antennas can therefore be optimized for a given operational environment. To provide polarization diversity, for example, the three transmit-side antennas might have three different polarizations, and the three receive-side antennas may have the same three polarizations arranged in the same or a different manner, or may have a different combination of polarizations. In some embodiments, the same polarization may be used for multiple antennas on either side of channel 315. For example, a mixture of three polarizations can be used in various ratios and positions for some larger number of transmit antennas, receive antennas, or both. System 300 may thus use both polarization diversity and polarization placement to optimize the MIMO interface.

Transmitter 305 and receiver 310 include respective polarization-select circuitry 325 and 330 to allow them to change the polarizations of transmit and receive antennas 320, respectively. Receiver 310 additionally includes test circuitry 335 and control logic 340. Test circuitry 335 issues a quality signal Qual indicative of the quality of the received signal DATA. Signal Qual might be, for example, a measure of the bit-error rate (BER) of the MIMO system. Control logic 340 is connected to polarization-select circuitry 330 and, via a wired or wireless backchannel 345, to polarization select circuitry 325. During a calibration sequence, control logic 340 steps through the available combinations of polarizations for the transmit and receive antennas and records quality signal Qual for each combination. Control logic 340 then selects the combination that produces the most desirable quality signal Qual as the optimum setting. Control logic might, for example, determine the combination of transmit and receive antenna polarizations that produce the lowest error rate for a desired level of speed performance. Either or both of test circuitry 335 and control logic 340 can be located elsewhere in communication system 300, including on the transmitter 305. Some conventional systems include some form of test circuitry within data recovery unit 145, and this may be adapted for use in other embodiments.

Figure 4:
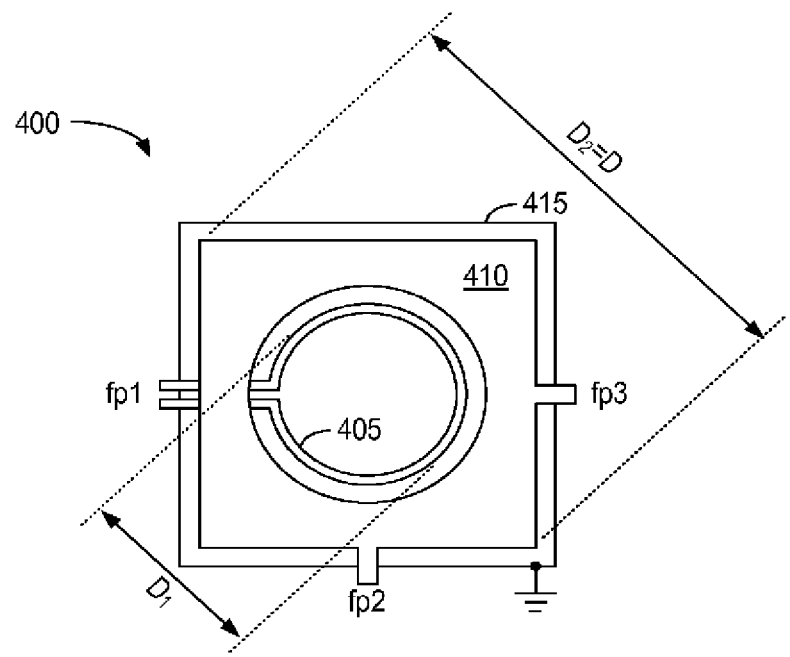
FIG. 4 illustrates an antenna 400 that supports three polarizations, and that can be used for antennas 320 of FIG. 3.

FIG. 4 illustrates an antenna 400 that supports three polarizations, and that can be used for antennas 320 of FIG.

3. Antenna 400 includes a loop antenna 405 with a differential feed fp1 and a patch antenna 410 with two orthogonal single-ended feeds fp2 and fp3. A ground plane 415 underlying the loop and patch antennas serves as the reference for patch antenna 410 as described earlier in connection with FIG. 2. Each of the loop and patch antenna planes can be separated from one another via insulating layers. These types of antenna structures are easily formed on integrated-circuit dies, packages, and printed-circuit boards. As shown, the largest dimensions $D_i$ are dimension $D_1$, for loop antenna 405, and dimension $D_2$ for patch antenna 410. The greater of these, dimension $D_2$, is the largest dimension D in this example.

Figure 5:
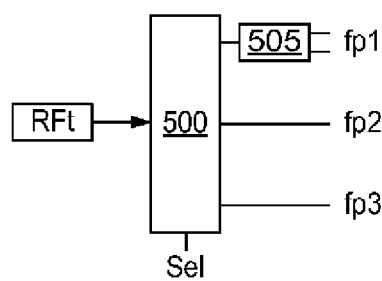
FIG. 5 depicts a switch 500 illustrating how polarization-select circuitry 325 of FIG. 3 can provide one or more of three polarities.

FIG. 5 depicts a switch 500 illustrating how polarization-select circuitry 325 (in transmitter 305) of FIG. 3 can provide one or more of three polarities for a signal from one of RF transmit amplifiers RFt when its outputs are connected to three feeds fp1, fp2, and fp3 of e.g. antenna 400 of FIG. 4. An input select port Sel1 connects a single-ended input from amplifier RFt to one or more of three single-ended outputs. The uppermost output feeds a balun 505 that converts the single-ended signal to a differential signal for feeding the differential input of e.g. loop antenna 405. Polarization-select circuitry 325 can include a similar demultiplexer for each MIMO channel. Alternatively, each antenna array can have a mixture of fixed and adjustable antennas, and select circuitry 325 can be configured accordingly.

Figure 6:
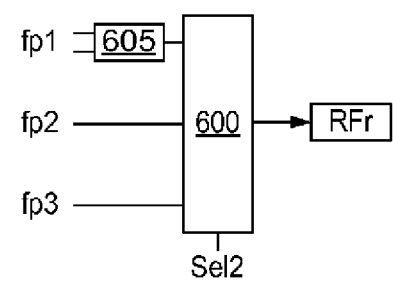
FIG. 6 depicts a switch 600 illustrating how polarization-select circuitry 330 of FIG. 3 can select one or more of three polarities.

FIG. 6 depicts a switch 600 illustrating how polarization-select circuitry 330 (in receiver 310) of FIG. 3 can select one or more of three polarities for signals received from a single or multiple antennas, such as an antenna 400 of FIG. 4. An input select port Sel2 selectively connects one or more of three inputs to the input of a receive amplifier RFr. The uppermost input includes a balun for converting a differential input to a single-ended signal for interfacing with e.g. a loop antenna. Polarization-select circuitry 330 can include a similar multiplexer for each MIMO channel. Alternatively, each antenna array can have a mixture of fixed and adjustable antennas, and select circuitry 330 can be configured accordingly.

Figure 7:
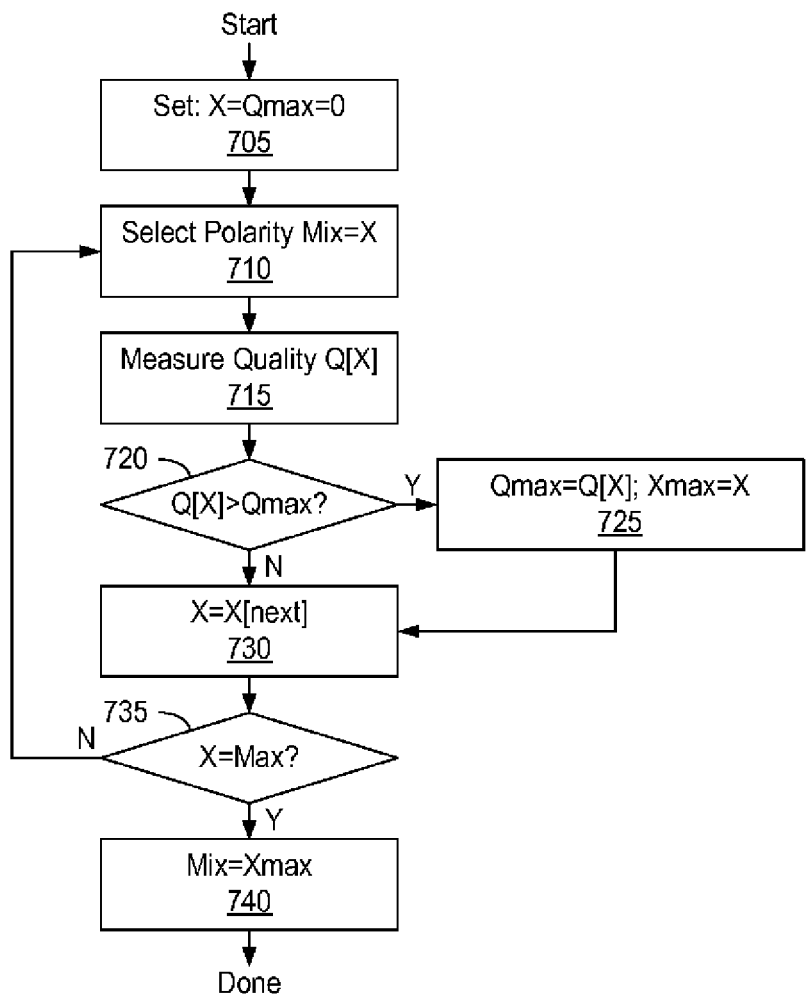
FIG. 7 is a flowchart 700 illustrating a method of optimizing antenna polarization and position diversity for system 300 of FIG. 3 in accordance with one embodiment.

FIG. 7 is a flowchart 700 illustrating a method of optimizing antenna polarization and position diversity for system 300 of FIG. 3 in accordance with one embodiment. Beginning at 705, two variables X and Qmax are set to their initial values. The value X is representative of a collective setting for polarization and spatial diversity for both sides of the MIMO channel. In system 300, for example, X represents the location and selected polarization of each antenna 320 in the transmit and receive antenna arrays. Qmax represents the highest quality measure for the MIMO channel in the signaling environment for which it is tested. BER is the measure of quality in this example, but other measures might be used with BER or in the alternative. For example, the MIMO channel might be tuned to provide the lowest power usage for a given minimum bandwidth, or to maximize bandwidth without exceeding a specified maximum BER.

At 710, controller 340 causes select circuitry 325 and 330 to select the combination of transmit and receive polarizations indicated by the variable X. The value X can represent all or a subset of the possible combinations. In other embodiments only a subset of the antennas are configurable (e.g., only the receive side, or a limited subset of one or both sides).

In 715, the MIMO channel is exercised and the quality measured. This process may be performed with the channel under some stress to increase the BER, and thus shorten the test process. Test circuitry 335 measures the quality of the MIMO channel (715) and compares the resulting quality value Q[X] with the value Qmax. If the measured value Q[X] is greater than Qmax, then Qmax is set Q[X] and a variable Xmax, which represents the best mixture of polarizations and their use locations in the antenna arrays, is set to X (725). Otherwise, the variable X is changed to its next setting X[next] (730) and test circuitry 335 decides whether all values of X have been considered (decision 735). If not, the process returns to 710 and repeats for the next value of X. If all X values have been considered, the polarization mix and their use locations in the antenna arrays is set to the value Xmax (740) and the calibration sequence is complete. This procedure can be carried out once, or can be repeated periodically to accommodate changes in the signaling environment.

Figure 8:
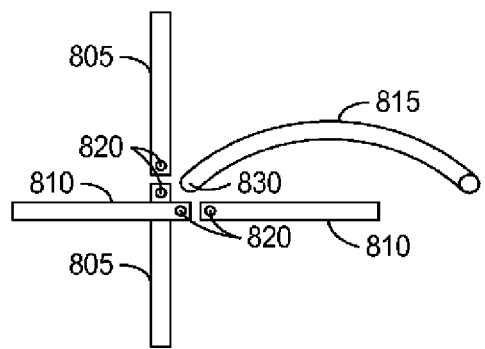
FIG. 8 depicts an antenna 800 in accordance with another embodiment. Antenna 800 actually includes three discrete antennas, a bond-wire antenna 815 and two perpendicular dipole strips 805 and 810.

FIG. 8 depicts an antenna 800 in accordance with another embodiment. Antenna 800 actually includes three discrete antennas, a bond-wire antenna 815 and two perpendicular dipole strips 805 and 810. Each of dipole strips 805 and 810 is made up of two collinear segments, and each segment includes a signal feed 820. Bond-wire antenna has a single feed 830 at one end. This collection of elements can be used to select from among three polarities in some embodiments. As with the antenna structures discussed previously, these structures can be easily formed on integrated circuits, packages, and printed-circuit boards.

Figure 9:
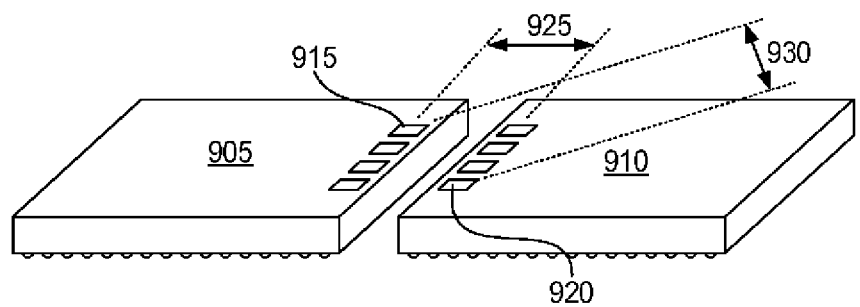
FIG. 9 depicts a pair of adjacent integrated-circuit packages 905 and 910, each of which includes a respective array of antennas 915 and 920 that form a near-field matrix channel in accordance with one embodiment.

FIG. 9 depicts a pair of adjacent integrated-circuit packages 905 and 910, each of which includes a respective array of antennas 915 and 920 that form a near-field matrix channel in accordance with one embodiment. Antenna 915 and 920 are arranged in linear arrays in this example, but other arrangements might also be used. The spacings between ones of antennas 915 and ones of antennas 920 range from a minimum of distance 925 and a maximum of distance 930. Both the minimum and maximum distances 925 and 930 place the receive antennas within the near field of each transmit antenna in this embodiment, but other arrangements are possible.

The relative configuration of polarizations in antenna arrays will vary in embodiments used in support of mobile communication (e.g., between cellular phones or personal digital assistants). In such cases devices sensing one another might go through a calibration sequence to determine the optimum polarization settings for a given orientation, or may repeat the calibration sequence periodically or responsive to e.g. errors to maintain a quality connection. Communication bandwidth might also be adjusted based on connection quality. In addition, or alternatively, mobile devices might provide users some feedback as to the effectiveness of a given placement and orientation of a mobile device with respect to a corresponding transmitter or receiver.

Figure 10:
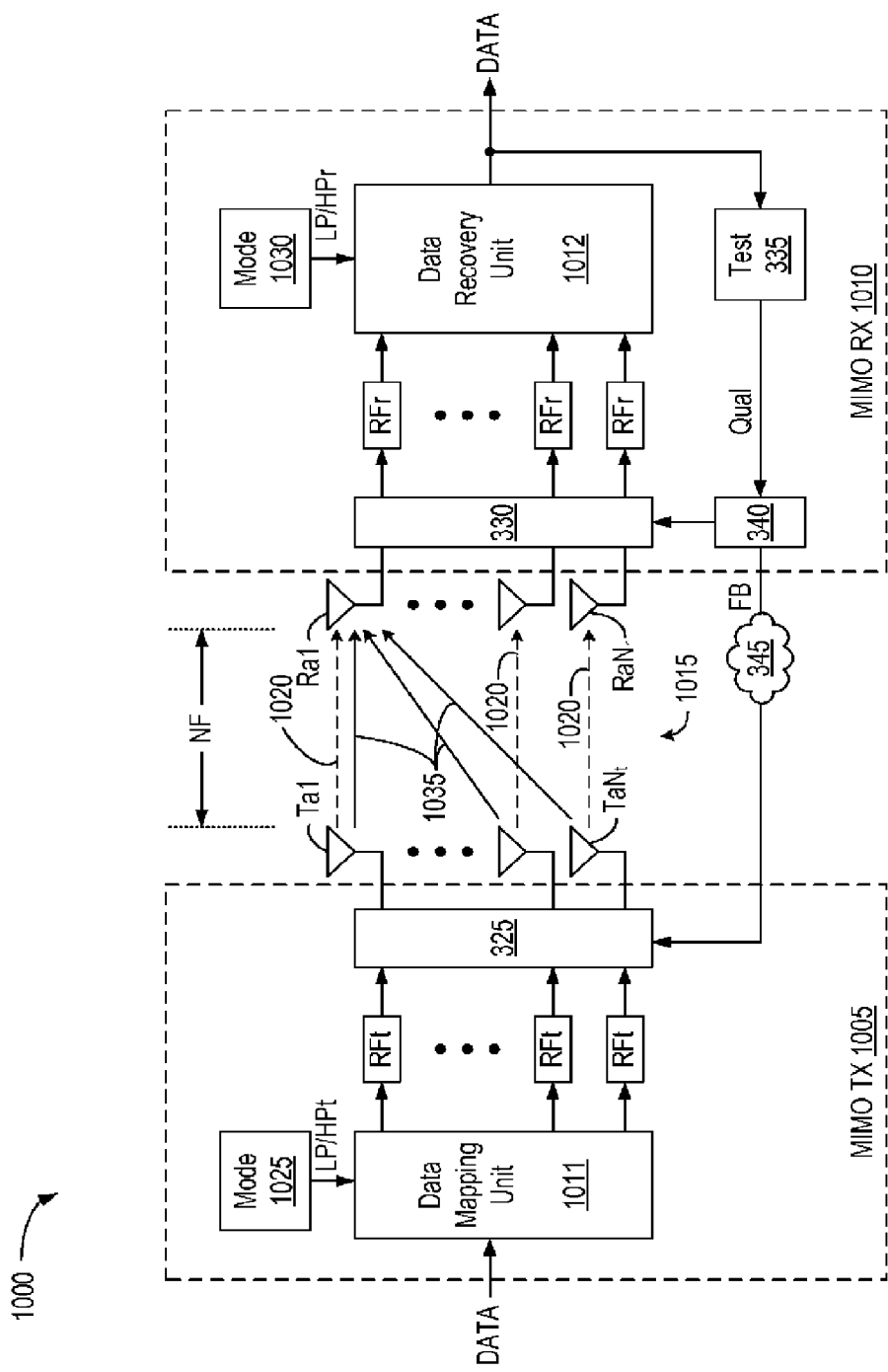
FIG. 10 depicts an NFC system 1000 in which a MIMO transmitter 1005 and MIMO receiver 1010 communicate via a near-field (NF) channel 1015.

FIG. 10 depicts an NFC system 1000 in which a MIMO transmitter 1005 and MIMO receiver 1010 communicate via a near-field (NF) channel 1015. System 1000 is in some ways similar to systems 100 and 300 of FIGS. 1 and 3, respectively, with like-identified elements being the same or similar. System 1000 differs from those systems, however, in that system 1000 supports at least two performance modes. In one mode, system 1000 operates through NF channel 1015 as a MIMO system, as described above. In a low power operational mode, system 1000 operates through NF channel 1015 as multiple single-input-single-output (SISO) systems. This results in a combined system with improved tolerance to interference, which simplifies signal recovery at the receiver and consequently saves power.

MIMO transmitter 1005 and MIMO receiver 1010 include respective mode registers 1025 and 1030, the outputs of which are connected to a data mapping unit 1011 and a data recovery unit 1012 to deliver respective mode-control signals LP/HPt and LP/HPr. In a high-performance mode, each of registers 1025 and 1030 stores a value that sets mapping unit 1011 and recovery unit 1012 to behave as the similarly named units 115 and 145 described above in connection with the embodiments of FIGS. 1 and 3. As in the prior examples, each transmit antenna transmits a signal to the receive antennas, and each receive antenna receives the resultant collection of Nt signal vectors. One such vector is illustrated as three signals 1035 arriving together at receive antenna Ra1 from the three transmit antennas TA[Nt:1]. Similar vectors, not shown, combined to make NF channel 1015 a matrix channel in the high-performance mode.

In the low-power mode, registers 1025 and 1030 store values that reconfigure mapping unit 1011 and recovery unit 1012. Data mapping unit 1011 is converted to a de-multiplexer that simply converts data stream DATA into some number of parallel data streams, one for each of transmit antennas Ta[Nt:1] in the depicted example. The polarization diversity provided by the transmit antennas reduces interference between the resultant parallel RF signals 1020. Receive antennas Ra[Nr:1] employ this polarization diversity to distinguish between the received signals. Rather than employing the relatively complex decoding techniques employed by MIMO receivers, data recovery unit 1012 is reconfigured into a multiplexer that simply combines the resulting parallel signals into a recovered data stream DATA. The remaining elements of FIG. 1000 are as detailed above.

Test circuitry 335 and control circuitry 340 can be used as detailed above to optimize the settings for select circuits 325 and 330 for both the high-performance and low-power modes. Mode registers 1025 and 1030 can be omitted in favor of other sources of control signals, and the source of these control signals can be within transmitter 1005, receiver 1010, or elsewhere. For example, a MIMO receiver might support a feedback channel that indicates whether the receiver is capable of operating at the higher data rate, allowing transmitter 1005 to respond accordingly.

An output of a process for designing an integrated circuit, or a portion of an integrated circuit, comprising one or more of the circuits described herein may be a computer-readable medium such as, for example, a magnetic tape or an optical or magnetic disk. The computer-readable medium may be encoded with data structures or other information describing circuitry that may be physically instantiated as an integrated circuit or portion of an integrated circuit. Although various formats may be used for such encoding, these data structures are commonly written in Caltech Intermediate Format (CIF), Calma GDS II Stream Format (GDSII), or Electronic Design Interchange Format (EDIF). Those of skill in the art of integrated circuit design can develop such data structures from schematic diagrams of the type detailed above and the corresponding descriptions and encode the data structures on computer readable medium. Those of skill in the art of integrated circuit fabrication can use such encoded data to fabricate integrated circuits comprising one or more of the circuits described herein.

In the foregoing description and in the accompanying drawings, specific terminology and drawing symbols are set forth to provide a thorough understanding of the foregoing embodiments. In some instances, the terminology and symbols may imply specific details that are not required to practice the invention. Moreover, some components are shown directly connected to one another while others are shown connected via intermediate components. In each instance the method of interconnection establishes some desired electrical communication between two or more circuit nodes (e.g., pads, lines, or terminals). Such interconnection may often be accomplished using a number of circuit configurations, as will be understood by those of skill in the art. Therefore, the spirit and scope of the appended claims should not be limited to the foregoing description. Only those claims specifically reciting "means for" or "step for" should be construed in the manner required under the sixth paragraph of 35 U.S.C. § 112.

I claim:

1. A communications system, comprising:
    a plurality of transmit antennae, wherein the plurality of transmit antennae have at least two different polarizations, and wherein each of the transmit antennae have a respective largest physical dimension (Di), and a greatest of the respective largest physical dimensions (Di) of the plurality of transmit antennae is a maximum dimension (D), wherein each of the transmit antennae are configured to transmit a respective modulated signal that encodes a respective data stream, at a wavelength ($\lambda$);
    a plurality of receive antennae, wherein the plurality of receive antennae have at least one receive antennae with a polarization matching a polarization of the plurality of transmit antennae, and wherein each receive antenna is spaced from all of the transmit antennae by a distance less than a greater of $2D^2/\lambda$ and $\lambda/2\pi$;
    a plurality of receivers, coupled to one or more respective receive antennae to recover data streams from signals received at the respective coupled receive antennae; and
    a data recovery unit coupled to the plurality receivers to recover data from the recovered data streams.

2. The communications system of claim 1, wherein the plurality of transmit antennae are configured for single input/single output (SISO) operation.

3. The communications system of claim 1, wherein the plurality of transmit antennae are configured for Multiple Input/Multiple Output (MIMO) operation.

4. A communications systems method, comprising:
    transmitting, from a plurality of transmit antennae, a respective modulated transmit signal that encodes a respective data stream at a wavelength ($\lambda$), wherein the plurality of transmit antennaes have at least two different polarizations, and each of the transmit antennae have a largest physical dimension (Di) and a greatest of the respective largest physical dimensions (Di) of the plurality of transmit antennae is a maximum dimension (D);
    receiving, by at least one respective receive antenna, each of the transmit signals; and
    during the transmitting and the receiving, maintaining the plurality of transmit antennae and the at least one respective receive antenna within a distance of each other that is less than a greater of $2D^2/\lambda$ and $\lambda/2\pi$.

5. The method of claim 4, further comprising adjusting polarizations of the transmit signals based on signal quality.

* * * * *